United States Patent [19]

Angelo, II

[11] Patent Number: 4,808,286

[45] Date of Patent: Feb. 28, 1989

[54] APPARATUS AND METHOD FOR MAXIMIZING PRODUCTION OF HEAT, GAS, AND ELECTRICITY THROUGH THE ACCELERATION OF HYDROGEN DISSOCIATION

[76] Inventor: J. F. Angelo, II, P.O. Box 55275, Little Rock, Ark. 72225

[21] Appl. No.: 29,267

[22] Filed: Mar. 23, 1987

[51] Int. Cl.[4] .................. C10B 47/20; C10B 49/06; B01J 1/10
[52] U.S. Cl. .................. 204/157.15; 204/157.41; 204/157.47; 204/157.52; 204/157.61; 204/164; 201/19; 201/32; 201/37; 202/131; 202/216; 202/211; 202/218; 110/342; 110/246; 110/247; 110/250; 361/230; 361/233; 422/186; 422/186.04; 422/186.21; 422/186.3
[58] Field of Search .................. 204/157.41, 157.47, 204/157.52, 157.15, 157.6, 157.16, 164, 165; 48/200, 202; 201/19, 22, 32, 33, 34, 36, 37, 38; 202/131, 105, 136, 211, 216, 218; 361/230, 233; 422/186, 186.04, 186.21, 186.22, 186.3; 110/342, 344, 346, 246, 247, 250

[56] References Cited

U.S. PATENT DOCUMENTS

| | | | |
|---|---|---|---|
| 1,334,590 | 5/1920 | Bloom | 204/157.4 |
| 3,827,379 | 8/1974 | Tsuruta et al. | 110/14 |
| 3,901,766 | 8/1975 | Smith | 201/32 |
| 3,907,520 | 9/1975 | Huang | 204/157.4 |
| 4,037,543 | 7/1977 | Angelo | 201/33 |
| 4,273,619 | 6/1981 | Angelo, II | 202/211 |
| 4,344,821 | 8/1982 | Angelo, II | 201/33 |

Primary Examiner—John F. Niebling
Assistant Examiner—Ben C. Hsing
Attorney, Agent, or Firm—Hill, Van Santen, Steadman & Simpson

[57] ABSTRACT

An apparatus for inducing and accelerating hydrogen dissociation in a cloud generated from feedstock fed into a chamber defined by the apparatus is provided. The apparatus includes a device for thermally stimulating the feedstock to generate the cloud, a device for localizing the cloud within the chamber, a device for electrically stimulating the localized cloud, and a device for photonically stimulating the localized cloud. A method is also provided.

18 Claims, 2 Drawing Sheets ively at the apparatus of the present invention.

APPARATUS AND METHOD FOR MAXIMIZING PRODUCTION OF HEAT, GAS, AND ELECTRICITY THROUGH THE ACCELERATION OF HYDROGEN DISSOCIATION

BACKGROUND OF THE INVENTION

This invention relates generally to a method and means for accelerating the dissociation of hydrogen. More specifically, this invention relates to a device and a method that increases thermal, electrical, and gas generation through the acceleration of hydrogen dissociation in a furnace.

U.S. Pat. No. 3,901,766 discloses a method and apparatus for producing charcoal. The method comprises introducing a material to be carbonized into, through, and out of a single chamber, retort, in which the material is heated to a carbonizing temperature by the combustion of gases emitted by the carbonization of previously inserted material. The gases are intermixed for combustion with air that is also injected into the chamber. The air and gases are directed and controlled in the chamber in such a manner that the carbonizing material is never exposed to sufficient oxygen to support free combustion thereof. An apparatus capable of carrying out the method is also disclosed.

The carbonization reaction is accompanied by a release of a large amount of gas. In the furnace disclosed in U.S. Pat. No. 3,901,766, the furnace causes a localized cloud of gas rich in water vapor and including methane to be driven off a tumbling bed of wet feedstock. Due to the construction and operation of the furnace, this gas will be localized in only a portion of the rotary kiln or other combustion device. For example, in a 1,000 cubic foot rotary kiln the gas will occupy approximately 100 cubic feet of the internal chamber. At lower temperatures, it has been observed that this localized cloud of gas tends to consume a large amount of energy and thus, penalizes the thermal efficiency of the combustion process.

It has been found that during the operation of such furnaces sometimes a furnace will have a temperature runaway on the upside. For example, a furnace operating at a temperature of 2,000° F. will suddenly take off to a temperature of approximately 2500° to about 2800° F. Moreover, it was found that the addition of water to the feedstock, and thereby to the localized cloud in the form of vapor, did not cool down the process as expected but, actually induced additional temperature elevation, temporarily. Inventor of the present invention hypothesizes that this phenomenon indicates that it is possible to induce and accelerate a hydrogen dissociation reaction taking place in the rotary furnace.

The present invention provides a method and apparatus for inducing and accelerating a hydrogen dissociation reaction to thereby extract the maximum amount of energy from the reaction.

SUMMARY OF THE INVENTION

The present invention provides an apparatus for inducing and accelerating hydrogen dissociation in a cloud generated from feedstock fed into a chamber defined by the apparatus. The apparatus includes means for thermally stimulating the feedstock to generate the cloud, means for localizing the cloud within the chamber, means for electrically stimulatng the localized cloud, and means for photonically stimulating the localized cloud.

Preferably, the means for electrically stimulating the cloud includes at least one pair of oppositely charged electrodes. Preferably, the means for photonically stimulating the localized cloud includes at least one laser. Preferably, the means for localizing the cloud includes rotating a retort defining the chamber about its longitudinal axis in a first direction and introducing air tangentially into a peripheral portion of the chamber not occupied by the feedstock in a second direction that is opposite to the first direction.

The present invention also provides a method for generating heat and electrical energy. The method comprises the steps of:

(a) introducing a feedstock into a retort;

(b) heating the feedstock so that at least a portion of the feedstock begins to carbonize or burn and gas is generated;

(c) localizing the generated gas into a localized cloud;

(d) introducing new feedstock and air into the retort whereby a continuous combustion of the feedstock is achieved; and (e) electrically and photonically stimulating the localized cloud to elevate the temperature of the cloud and accelerate hydrogen dissociation within the cloud.

Preferably, the localized cloud is alternately electrically and photonically stimulated. Preferably, the cloud is photonically stimulated by pulsing at least one laser. Preferably, the cloud is electrically stimulated by generating a spark between at least two oppositely charged electrodes.

Accordingly, it is an advantage of the present invention to provide a method and apparatus for inducing and accelerating the dissociation of hydrogen.

A further advantage of the present invention is that it provides a device and method that increases thermal, electrical, and gas generation in a furnace.

Furthermore, an advantage of the present invention is that it provides a method and apparatus for inducing an electron avalanche.

Another advantage of the present invention is that it provides a method and apparatus for generating energy for jamming or disrupting telecommunications &/or radio signals.

Moreover, an advantage of the present invention is that it provides a more efficient furnace.

Additional features and advantages are described in, and will be apparent from, the detailed description of the presently preferred embodiments and from the drawings.

DETAILED DESCRIPTION OF THE PRESENTLY PREFERRED EMBODIMENTS

Rotary furnaces for reducing cellulosic waste such as wood chips, waste, and like feedstock to charcoal or burning said feedstock completely to produce furnace heat and ash are known in, for example, U.S. Pat. Nos. 3,901,766 and 4,037,543. During, for example, the heating of the wood, free moisture and volatile hydrocarbon constituent elements of the wood are driven off. This process is called carbonization. Due to the construction of the apparatus disclosed in U.S. Pat. No. 3,901,766 and U.S. Pat. No. 4,037,543, the gases driven from the wood, or other feedstock, are localized adjacent to the feedstock. These gases are rich in water vapor, as well as other gases, including, methane, carbon monoxide, carbon dioxide oxygen, and hydrogen.

The present invention provides an apparatus and means for "burning the water" in the localized gas. Specifically, the present invention provides a means and apparatus for accelerating the dissociation of hydrogen reaction taking place in the furnace. By accelerating the dissociation of hydrogen, this affords the present invention the means to extract the maximum amount of energy from the furnace. Moreover, as set forth in more detail below, this also affords generation of energy through an electron avalanche. Furthermore, the method and means of the present invention can provide a means for disrupting and "jamming" telecommunications.

Figure 1:
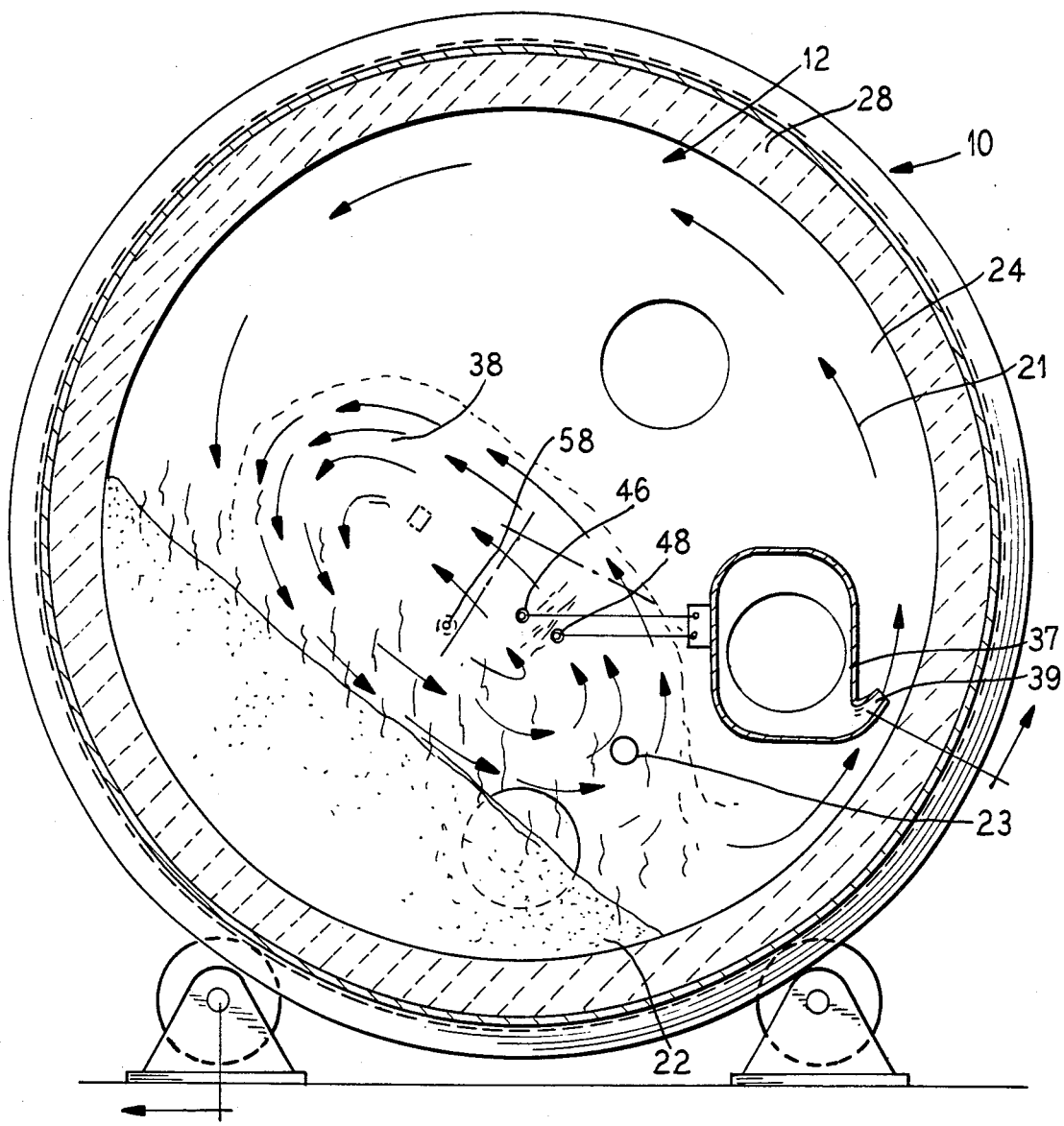
FIG. 1 illustrates a front elevational cross-sectional schematic view of an embodiment of the apparatus of the present invention.
Figure 2:
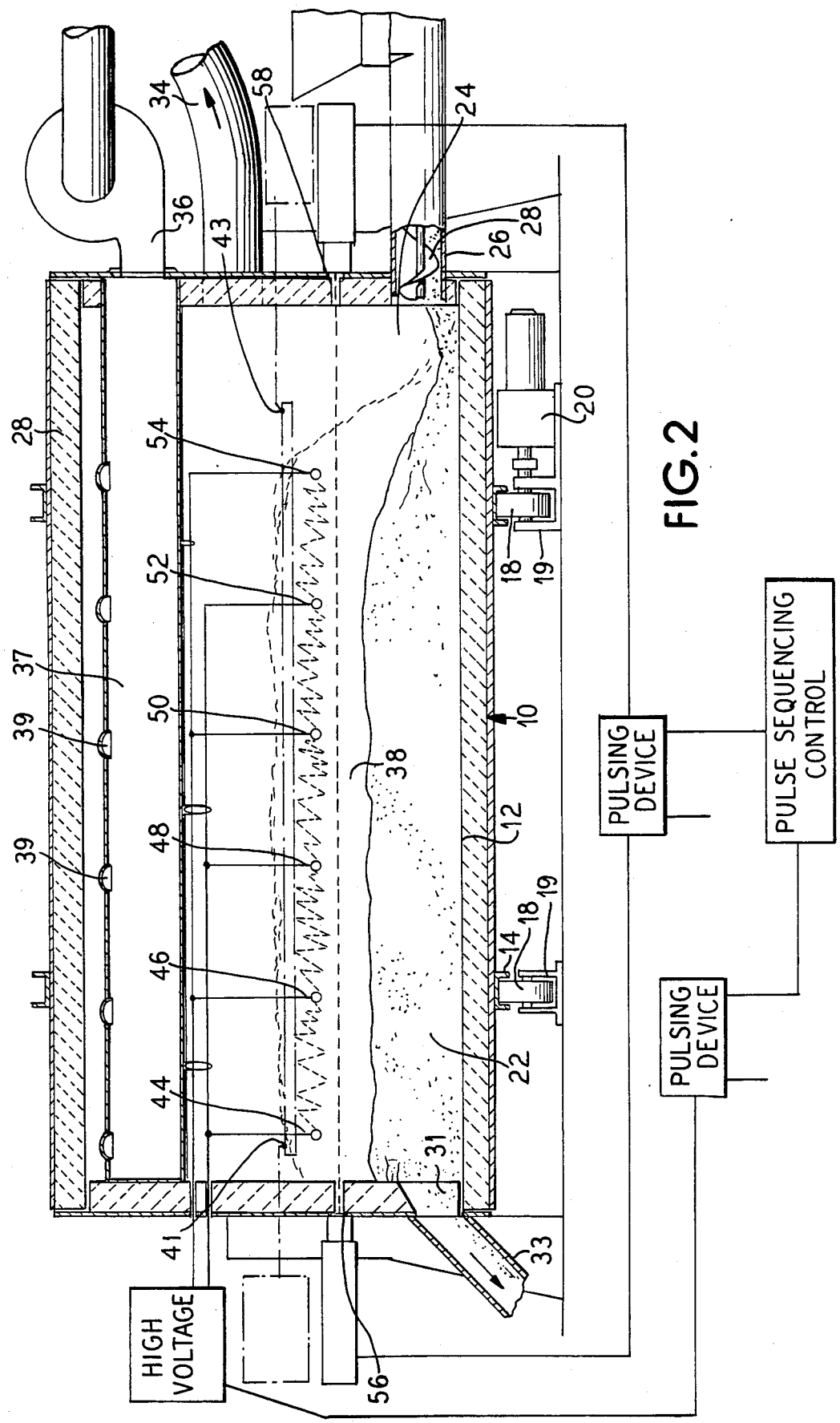
FIG. 2 illustrates a cross-sectional view taken along lines II—II of the apparatus of FIG. 1.

Referring now to FIGS. 1 and 2, an embodiment of the apparatus for accelerating the dissociation of hydrogen is illustrated. Although the embodiment illustrated of the apparatus is a rotary furnace, such as disclosed in U.S. Pat. No. 3,901,766, it is intended that the method of the present invention can be utilized with any apparatus that can localize a cloud of gas containing water vapor and withstand the temperatures set forth herein. The apparatus 10 comprises a retort 12 which constitutes a large cylindrical vessel with its axis inclined slightly from the horizontal, about a pair of track members 14. Each track member 14 is supported by a pair of rollers 18 disposed respectively at opposite sides of the midline of the retort, each roller being carried rotatably by a ground supported block 19. A motor 20 rotates at least one pair of rollers causing the retort 12 to slowly rotate. Preferably, the retort 12 is turned slowly, e.g., about 2 to 3 r.p.m., about its axis.

Feedstock is admitted to the chamber 24 of the retort by an auger tube 26 in which is carried a rotatably driven helical auger 28. The auger tube 26 is operable to deliver feedstock from any suitable source (not shown) into the higher portion of the retort 12. As discussed in detail below, the feedstock is deposited continuously in the higher end of the retort 12 by the auger tube 26 and regathers at the bottom of the retort 12. Due to the rotation of the retort 12 a bed of feedstock 22 is generated in the retort. The feedstock utilized can comprise simply waste, coals, wood chips, or other high moisture feedstocks including cellulosic wastes.

Initially, an external fuel source, such as a gas, is introduced into the retort 12 by, for example, a fuel pipe by a manual control valve, and to a jet 23. The external fuel source is burned to elevate the temperature of at least some of the feedstock to at least the carbonization level, about 550° F. for wood chips. When carbonization of the feedstock is thus initiated, the reaction is thereafter spontaneous, continuing until the feedstock is fully carbonized to charcoal. Of course, other means for initiating the carbonization of the feedstock can be utilized.

Air is injected in the retort 12 by a blower 36. The blower 36 functions to inject air into the system in an opposite direction to the rotation of the retort 12, i.e., if the retort is rotating clockwise, the blower 36 injects air in a counterclockwise manner. To this end, the blower 36 injects air into a pipe 37 that injects air into the retort through holes 39. The holes 39 are preferably spaced along the length of the retort 12. Accordingly, a helical, circumferential swirl patter, indicated by arrows 21, is induced within the chamber 24 of the retort 12.

Because air is injected by the blower 36 tangentially, away from the bed of feedstock, and in an opposite direction to the rotation of the retort, the gases that induced by the heating of the feedstock, i.e., water vapor, methane, carbon monoxide, hydrogen, and oxygen, are localized in a cloud 38 adjacent to the feedstock as illustrated in FIG. 1. These gases will be localized in an area that comprises only approximately 10% of the total internal area of the retort 12.

Although it is possible to control the flow of air to prevent the feedstock from completely burning, in the present application, enough air is added to cause substantially full combustion of the feedstock, rather than mere carbonization thereof. Full combustion of the feedstock elevates the temperature to approximately 2000° F. By adding sufficient feedstock to the retort 12 and injecting sufficient air, the combustion of the feedstock will be spontaneous.

The inner walls of the retort 12, including the end walls, are provided with a thick lining 28 of ceramic insulating material so that the retort 12 can withstand the temperatures envisioned. At a front end of the retort 12 is located an aperture 31 and pipe 33 through which inert ash generated by the combustion of the feedstock exits the retort 12. A gas outlet 34 retrieves heated gas from the retort 12 that is then recovered as energy. Because, as set forth below, temperatures approaching 4000° F. will be generated, the heated gas recovered will have a temperature approaching approximately 4000° F. An afterburner (not shown) can be utilized to treat the gas exiting the retort 12 through the gas outlet 34 so that the gas is polution free. An example of such an afterburner is disclosed in U.S. Pat. No. 4,037,543.

As will be described in detail hereinafter, the apparatus and method of the present invention induces and accelerates the hydrogen dissociation of the water vapor in the localized cloud. To this end, the method of the present invention utilizes thermal, photochemical, and electrical stimuli to ionize, excite, and stimulate, the molecules and atoms of the gas and elevate the temperature of the localized gas in order to break down the water vapor cloud to its most elemental form and release the maximum amount of energy in the form of heat energy and electrical energy. The thermal energy is provided by the combustion of the feedstock. As set forth above, this combustion will elevate the temperature of the feedstock and localized cloud to approximately 2000° F.

To provide the electrical stimulus to the cloud, the apparatus of the present invention preferably includes within the retort 12 a plurality of electrodes 44, 46, 48, 50, 52, and 54 that are linearly spaced throughout the length of the chamber 24 of the retort 12 and thereby the length of the localized cloud. The electrodes 44, 46, 48, 50, 52, and 54 are oppositely charged and are positioned so that a spark can be thrown the entire length of the retort 12. Although, six electrodes 44, 46, 48, 50, 52, and 54 are illustrated, any number of pairs of oppositely charged electrodes can be utilized. These electrodes 44, 46, 48, 50, 52, and 54 function to throw an arc between the electrodes much in the same way as a lightening bolt or a spark plug. However, the spark or arc is localized within the localized cloud 42. The electrodes, 44, 46, 48, 50, 52, and 54 are connected to a high voltage source that is pulsed by means of a pulsing device that is controlled by a pulse sequencing control. The pulse sequencing control insures that the cloud is alternately, electrically and photonically stimulated.

Before a spark or arc between the electrodes is generated, the cloud of gas will have a temperature of approximately 2000° F. due to the combustion of the feedstock as previously stated. Accordingly, not only will the localized cloud be affected by a thermal stimuli but also by an electrical stimuli. As set forth hereinafter, the cloud will also be stimulated by a photochemical stimuli.

To photochemically excite the atoms and molecules, primarily the water vapor, in the localized cloud a laser can be utilized. Preferably, two lasers 56 and 58 are utilized and are located at each end of the retort 12 in a position so that the laser beams generated by the lasers 56 and 58 will be exerted through substantially the cross-sectional center of the localized cloud 42. Although two lasers are illustrated, one or more lasers can be utilized to photochemically stimulate the localized cloud 42. In order to conserve energy, preferably the lasers 56 and 58, and the electrodes 44, 46, 48, 50, 52, and 54 are pulsed to excite the gases in the localized cloud 42.

By way of example, a laser that has been found to function satisfactory is one that generates a 25 nanosecond half-width emmission having peak powers of 3 to 5 MW. The laser is a Q-spoiled ruby laser with rotating prism and 2 cm focal length lens. The laser included an H cell designed for 100 atmospheres of pressure. It should be noted though, that other lasers can also be utilized.

By utilizing a photochemical stimuli generated by the lasers 56 and 58, an electrical stimuli generated by the electrodes 44, 46, 48, 50, 52, and 54, and a thermal stimuli, temperatures of the localized gas 42 can be driven to between approximately 3700° F. and 4000° F. At these temperatures, a dissociation of hydrogen is produced whereby the primary reactions within the water vapor cloud involving water as a reactant is to break down the water to $H_2$ and O or 2H and O. Other dissociation reactions within the cloud include, among others: $H_2O \rightarrow H+OH$; $H_2 \rightarrow H+H$; $2H_2 \rightarrow 4H+O_2$; $2H_2O \rightarrow 2H+H_2+O_2$; and $3H_2O \rightarrow 2H+2H_2+O_2+O$. Thus, the water vapor cloud is reduced to its most fundamental elemental form and large amounts of energy in the form of heat and electricity via the flow of free electrons are released and can be harnessed for power usage.

At the temperatures generated (i.e., 3600° F. to 4000° F.), the localized cloud may become a plasma, i.e., an electrified gas with atoms dissociated into positive ions and negative electrons. Thus, ionization avalanches and break-downs of the gas leading to optimal ionization and maximum dissociation of $H_2O$ is expected. Although the dissociation of hydrogen and the break down of the water vapor is the primary reaction that will occur in the localized gas 38, other secondary reactions including atoms, molecules, and ions of hydrogen and oxygen as the reactant will occur.

An example of a method of the present invention comprises a first step of thermally stimulating the feedstock. Step two includes ionizing the water vapor located in a localized cloud generated in the ultra-violet and usable spectrum, i.e., the spectrum of the spark or arc between the electrodes. Step 3 is the bombardment of the localized cloud photonically with, for example, a pulse of a laser. As discussed above, the localized cloud may become a plasma at the temperatures created. The frequencies of the pulsed lasers, and its spectra, should be chosen in order to maximize the benefits of the spectra. Preferably, lasers are pulsed alternately with a spark between the electrodes.

It is believed that in view of the stimuli generated above on the localized gas that negative ions will be induced in the localized cloud and an electron avalanche will be generated. To this end, the gas in the cloud will breakdown causing electrons to be released. Accordingly, a fourth step in the method would be the release of energy and the inducement of an electron avalanche. During the expected electron avalanche phenomenon, streams of charged particles, negative and positive, will flow from the localized gas. These particles can be collected by electron gatherers shown at 41 and 43.

The method and apparatus of the present invention also produces an additional feature. In addition to energy in the form of heat and power produced by the utilization of the three stimuli on the localized gas, energy in the form of electricity is also produced. These pulsed high energy bursts, emanating from the system, can be utilized to cause electrical, radio, and other telecommunication interruptions and jamming. Accordingly, the method and apparatus of the present invention may also have applications in areas that desire such telecommunications interrupting and jamming, for example, military uses.

The inventor believes that once the temperature within the chamber of the localized gas achieves approximately 4000° F., that the process may become spontaneous. It is believed that spontaneous combusion of the hydrogen will occur at 3700° F. Accordingly, the need to photonically and electrically simulate the localized cloud may not be required or will be required at substantially less frequent intervals.

It should be understood that various changes and modifications to the preferred embodiments described herein will be apparent to those skilled in the art. Such changes and modifications can be made without departing from the spirit and scope of the present invention and without diminishing it attendant advantages. It is therefore intended that such changes and modifications be covered by the appended claims.

I claim:

1. A rotary kiln system for inducing and accelerating hydrogen dissociation in a cloud generated from feedstock capable of being carbonized and fed into a chamber defined by the rotary kiln comprising:
    means for thermally stimulating the feedstock to generate the cloud;
    means for localizing the cloud within an area of the chamber, the means including means for rotating a retort defining the chamber about its longitudinal direction in a first direction and means for introducing air tangentially into a peripheral portion of the chamber not occupied by the feedstock in a second direction that is opposite to the first direction;
    means for electrically stimulating the localized cloud; and
    means for photonically stimulating the localized cloud.

2. The apparatus of claim 1 wherein the means for electrically stimulating the localized cloud includes at least one pair of oppositely charged electrodes.

3. The apparatus of claim 1 wherein the means for photonically stimulating the localized cloud includes at least one laser.

4. The apparatus of claim 1 wheren the means for thermally stimulating the feedstock includes means for initially heating the feedstock to a temperature where a portion of the feedstock begins to carbonize and means for subsequently adding feedstock and sufficient air whereby a continuous combustion of the feedstock is established.

5. The apparatus of claim 1 wherein:
the means for electrically stimulating the localized cloud includes a plurality of oppositely charged electrodes; and
the means for photonically stimulating the cloud includes at least one laser, the laser and electrodes being alternately pulsed.

6. A rotary kiln system for thermally, photonically and electrically stimulating a localized cloud rich in water vapor comprising:
a vessel for containing the localized cloud rich in water vapor;
means for initiating combustion of the feedstock;
at least one pair of oppositely charged electrodes for electrically stimulating the cloud;
at least one laser for photonically stimulating the localized cloud; and
means for localizing the localized cloud including means for rotating the vessel in a first direction and means for injecting air tangentially into the vessel in a second direction, opposite to the first direction.

7. The apparatus of claim 6 including two lasers located at opposite ends of the vessel for photonically stimulating the cloud.

8. The apparatus of claim 6 including a plurality of oppositely charged electrodes extending for a distance equal to a length the cloud extends in the vessel.

9. The apparatus of claim 6, wherein the electrodes and laser are alternately pulsed.

10. A method for generating heat and electrical energy comprising the steps of:
introducing a feedstock capable of being carbonized into a retort;
heating the feedstock so that at least a portion of the feedstock begins to at least carbonize and heated gas is generated;
localizing the generated gas into a localized cloud by rotating the retort in a first direction and injecting air into the retort tangentially in a second direction opposite to the first direction;
introducing new feedstock capable of being carbonized and air into the retort whereby a continuous combustion of the feedstock is achieved; and
electrically and photonically stimulating the localized cloud to elevate the temperature of the cloud.

11. The method of claim 10 wherein the localized cloud is alternately electrically and photonically stimulated.

12. The method of claim 10 including the step of electrically stimulating the localized cloud by creating a spark between at least one pair of oppositely charged electrodes.

13. The method of claim 10 including the step of photonically stimulating the localized cloud by generating a laser beam into the localized cloud.

14. The method of claim 10 including the step of electrically and photonically stimulating the cloud to elevate the temperature of the cloud to at least 3600° F.

15. The method of claim 10 including a step of creating an electron avalanche by so simulating the cloud.

16. The method of claim 15 including a step of collecting the electrons flowing from a cloud.

17. The method of claim 10 including a step of collecting at least some of the heated gas generated in the retort.

18. The method of claim 10 including a step of generating electrical impulses capable of disrupting telecommunications.

* * * * *